United States Patent
Baitz et al.

(10) Patent No.: US 9,824,547 B2
(45) Date of Patent: Nov. 21, 2017

(54) CASH REGISTER SYSTEM WITH PIVOTABLE ARMS

(71) Applicant: Wincor Nixdorf International GmbH, Paderborn (DE)

(72) Inventors: Guenter Baitz, Berlin (DE); Wilfried Lueke, Schloss Holte-Stukenbrock (DE)

(73) Assignee: Wincor Nixdorf International GmbH, Paderborn (DE)

(*) Notice: Subject to any disclaimer, the term of this patent is extended or adjusted under 35 U.S.C. 154(b) by 0 days.

(21) Appl. No.: 15/407,320

(22) Filed: Jan. 17, 2017

(65) Prior Publication Data

US 2017/0206750 A1    Jul. 20, 2017

(30) Foreign Application Priority Data

Jan. 15, 2016 (EP) .................................. 16151455

(51) Int. Cl.
*G06K 15/00* (2006.01)
*G07G 1/00* (2006.01)

(52) U.S. Cl.
CPC .................................. *G07G 1/0018* (2013.01)

(58) Field of Classification Search
CPC ....... G07F 7/088; G06Q 20/20; G06F 1/1632; G06F 1/1616
USPC .................. 235/375, 379, 383; 705/16, 27.1
See application file for complete search history.

(56) References Cited

U.S. PATENT DOCUMENTS

| | | | | |
|---|---|---|---|---|
| 6,073,838 A | * | 6/2000 | Baitz | G07G 1/0018 235/375 |
| 6,629,636 B1 | * | 10/2003 | Hayashi | A47F 9/04 235/379 |
| 2005/0156024 A1 | * | 7/2005 | Ichikawa | G07G 1/0018 235/379 |
| 2007/0058329 A1 | | 3/2007 | Ledbetter et al. | |
| 2012/0131826 A1 | | 5/2012 | Dai | |
| 2012/0268398 A1 | | 10/2012 | Kato | |
| 2013/0020445 A1 | | 1/2013 | O'Kasick et al. | |

FOREIGN PATENT DOCUMENTS

WO    2014/160959    10/2014
WO    2016/001138    1/2016

OTHER PUBLICATIONS

European Search Report dated May 31, 2016.

* cited by examiner

*Primary Examiner* — Jamara Franklin
(74) *Attorney, Agent, or Firm* — Black McCuskey Souers & Arbaugh LPA

(57) ABSTRACT

A cash register system (10, 100) has an arm (16, 22) for holding a display unit (18, 24). The arm (16) has a first section (24, 30) and a second section (28, 34) pivotable relative thereto. The second section (28, 34) is pivotable relative to the first section (28) between a first position in which the display unit (18, 24) is arranged above a receiving area (36) and a second position in which the display unit (18, 24) is not arranged above this receiving area (36).

15 Claims, 8 Drawing Sheets

CASH REGISTER SYSTEM WITH PIVOTABLE ARMS

BACKGROUND

1. Field of the Invention

The invention relates to a cash register system comprising a carrier unit for mounting the cash register system on a base surface, a first display for displaying information to an operator and/or a customer as well as a first arm for holding the display unit.

2. Description of the Related Art

Known cash register systems usually have two display units, one of them being directed to the customer and the other being directed to the cashier. Further, known cash register systems have a computer as well as a receipt printer by means of which the receipt for the customer is printed after the check-out operation. The display units are usually arranged on support arms and directed to the side of the customer and the cashier, respectively.

The receipt printer has to be maintained on a regular basis. In particular, the corresponding paper roll has to be replaced regularly. In known cash register systems, due to the displays the receipt printer can only be accessed in a limited manner so that the maintenance is only possible with high effort and corresponding skill.

In other cash register systems, the displays are arranged at a great distance to the receipt printer for a better maintenance. As a result, the cash register system requires very much space, which is disadvantageous in the case of the usually confined space conditions at supermarket checkout counters.

It is an object of the invention to provide a cash register system that is designed in a compact manner and nevertheless allows for an easy and convenient access to the receipt printer and/or the computer.

SUMMARY

The invention relates to a cash register system with a carrier unit for mounting the cash register system on a base, a first display unit for displaying information to an operator and/or to a customer and a first arm for holding the display unit. The first arm has a first section and a second section pivotable relative to the first section. An end of the end of the first section opposite to the second section is mounted to the carrier unit. In particular, the first section is mounted to the carrier unit immovably so that the orientation of the carrier unit and of the first section to each other is fixed.

The first display unit is mounted to an end of the second section opposite the first section. More particularly, a mounting unit may be provided on the second section for the detachable and re-attachable mounting of the display unit.

A receiving area may be delimited by the carrier unit and the first section of the first arm for receiving a receipt printer. The receiving area may be designed so that the receipt printer can be mounted on assembling units provided therefor. The receiving area may be delimited downward by the carrier unit and laterally by the first section of the first arm when the cash register system is oriented as intended.

The second section of the first arm may be articulated to the first section thereof so that, in a first position, the second section of the first arm is arranged above the receiving area and in a second position the second section of the first arm is arranged so that it is not arranged above the receiving area so that the area above the receiving area is free, in particular over the entire width of the carrier unit.

Thus, the cash register system, on the one hand, is designed in a compact manner while nevertheless providing easy access to the units arranged within the receiving area. The compact structure is achieved in that the second section and the first display unit mounted thereon are arranged above the receiving area and thus above the receipt printer and/or the computer in the first position so that only a very small base surface is required during the actual use of the cash register system. For maintenance purposes, the second section and thus the first display unit can simply be pivoted from the first into the second position so that the entire area above the receipt printer and/or computer, i.e. the entire area directly above the mentioned units, is free. Thus, a cover of the receipt printer and/or computer can be removed easily and conveniently for maintenance purposes. After maintenance, the cover is put on again and the second section again is pivoted from the second position into the first position together with the first display unit mounted thereon, so that the cash register system is ready for use again.

The first position may be the position in which the second section and the first display unit are arranged during the use of the cash register system. The second position, on the other hand, may be the position in which the second section and thus the first display unit are arranged during maintenance.

The cash register system may further comprise a second display unit for displaying information to an operator and/or a customer as well as a second arm for holding this second display unit. In particular, one of the two display units is used for displaying the information to the customer and the other is used as a display for the operator, i.e. in particular a cashier. Thus, both the customer and the operator can see the displayed information such as the already scanned goods and their prices simultaneously and conveniently.

The second arm may comprise a first and a second section pivotable relative to the first section. The end of the first section of the second arm opposite to the second section may be mounted to the carrier unit, and the second display unit may be arranged at the end of the second section of the second arm opposite to the first section of the second arm.

Thus, the receiving unit for receiving the receipt printer and/or computer is delimited at the side of the second arm by the section of the second arm.

The second arm also may be designed such that the second section of the second arm is articulated to the first section of the second arm so that in a first position the second section of the second arm is arranged above the receiving area and in a second position the second section of the second arm is arranged so that the area above the receiving area is free, i.e. in this second position the second section and thus the second display unit arranged thereat is not above the receiving area and in particular not above a receipt printer.

In this way, the second section of the second arm and the second display unit easily can be pivoted away for maintaining the units arranged in the receiving area so that despite a compact structure an easy maintenance is possible.

The first arm and the second arm may be structured identically so that only a few parts are required for the manufacture and thus a cost-efficient manufacture is possible. On the other hand, a pleasing design is achieved in this way.

In the second position, the second section of the first arm may be pivoted relative to the first position by an angle between 70° and 110°, in particular by an angle of about 90°. Accordingly, the second section of the second arm also may be pivoted relative to the first position by an angle between 70° and 110°, in particular by an angle of about 90°, in the second position. In an alternative embodiment, the first and/or the second arm can also be designed so that the second section is pivotable about approximately 180° relative to the first section in each case so that an even better access to the receiving area is possible.

In the first position, the first section of the first arm may be arranged approximately orthogonally relative to the second section of the first arm and the first section of the second arm may be arranged approximately orthogonally relative to the second section of the second arm. This results in a particularly compact structure.

In the second position, the first section and the second section of the first arm and the first section and the second section of the second arm, respectively, may be arranged in one plane so that the entire first and second arm, respectively, are designed as an elongated arm and thus as little space as possible is taken up and a particularly easy access to the units arranged in the receiving area is possible.

The first section and the second section of the first arm and the first section and the second section of the second arm may be connected respectively to each other via an articulation. Each articulation may be designed so that the second section is mounted pivotably about an axis of rotation relative to the first section. This pivotability enables the corresponding adjustment of the second section between the first and the second position is made possible.

The articulation of the first arm and/or the articulation of the second arm may be designed such that the respective display unit of the respective arm is arranged to tilt about a tilting axis for setting the viewing angle of the display unit. This tilting axis may be orthogonal to the axis of rotation about which the second section is pivoted when adjusted between the first and the second position. Thus, the viewing angle can easily be brought into a position that is ergonomically favorable for the user.

The articulations of the arms also can be designed as three-valued articulations by which each of the second sections can be pivoted relative to the first section about three axes that may be orthogonal to each other. In this way, the adjustability of the arms is increased further to achieve even better access to the receiving area and a more variable orientation of the display units.

The first section and/or the second section can be tube-shaped and can be mounted so that they are rotatable about their longitudinal axis. In this way, an adjustability about the axis is achieved.

The first section of the first arm and/or the first section of the second arm may be arranged respectively on the carrier unit movably in a predetermined direction relative to the carrier unit. For this, the arms may be arranged on slides that are guided on rails arranged on the carrier unit. This movability makes the access to elements arranged in the receiving area easier.

The first and/or the second display unit respectively may comprise a screen, in particular a touch screen so that information can likewise be input via the display unit. The screen can be arranged fixedly on the respective second section. In an alternative embodiment of the invention, only a mounting unit can be arranged on the second section, the mounting unit can be configured to receive a tablet can as a display unit.

The two arms may be arranged on opposite sides of the carrier unit. In particular, the cash register system may be axially symmetrical relative to an axis running through the center point of the carrier unit and standing orthogonally on the carrier unit. Thus, a particularly compact structure and a pleasing design is achieved.

Both arms may be mounted to the carrier unit so that their longitudinal axes do not extend vertically but are inclined in the case of an intended horizontal orientation of the carrier unit. In particular, the two arms may be inclined toward opposite sides so that the one arm is inclined toward the customer and the other toward the operator. As a result, the screens are arranged relatively close to the respective position and do not interfere with one another in the first position.

The carrier unit may be plate-shaped and may have several holes through which screws or similar elements can be passed for screwing the carrier unit to the base surface.

The carrier unit may have a receiving area to receive a computer, in particular a minicomputer. As a result, a particularly compact structure is achieved. This receiving area may be surrounded by the housing area of the carrier unit on all sides so that the computer is protected.

The carrier unit and/or the receiving area may be designed so that the receipt printer is receivable therein in at least two different orientations and may be mountable on the carrier unit. The receipt printer may be arranged to be rotated by 180° in these two orientations. Thus, the receipt printer optionally can be arranged to output the receipt to the operator or directly to the customer.

A cover flap may be provided on the carrier unit for covering and protecting interfaces and cables of the printer and/or computer.

Further features and advantages of the invention result from the following description that explains the invention in more detail in connection with the enclosed Figures on the basis of embodiments.

DETAILED DESCRIPTION

Figure 1:
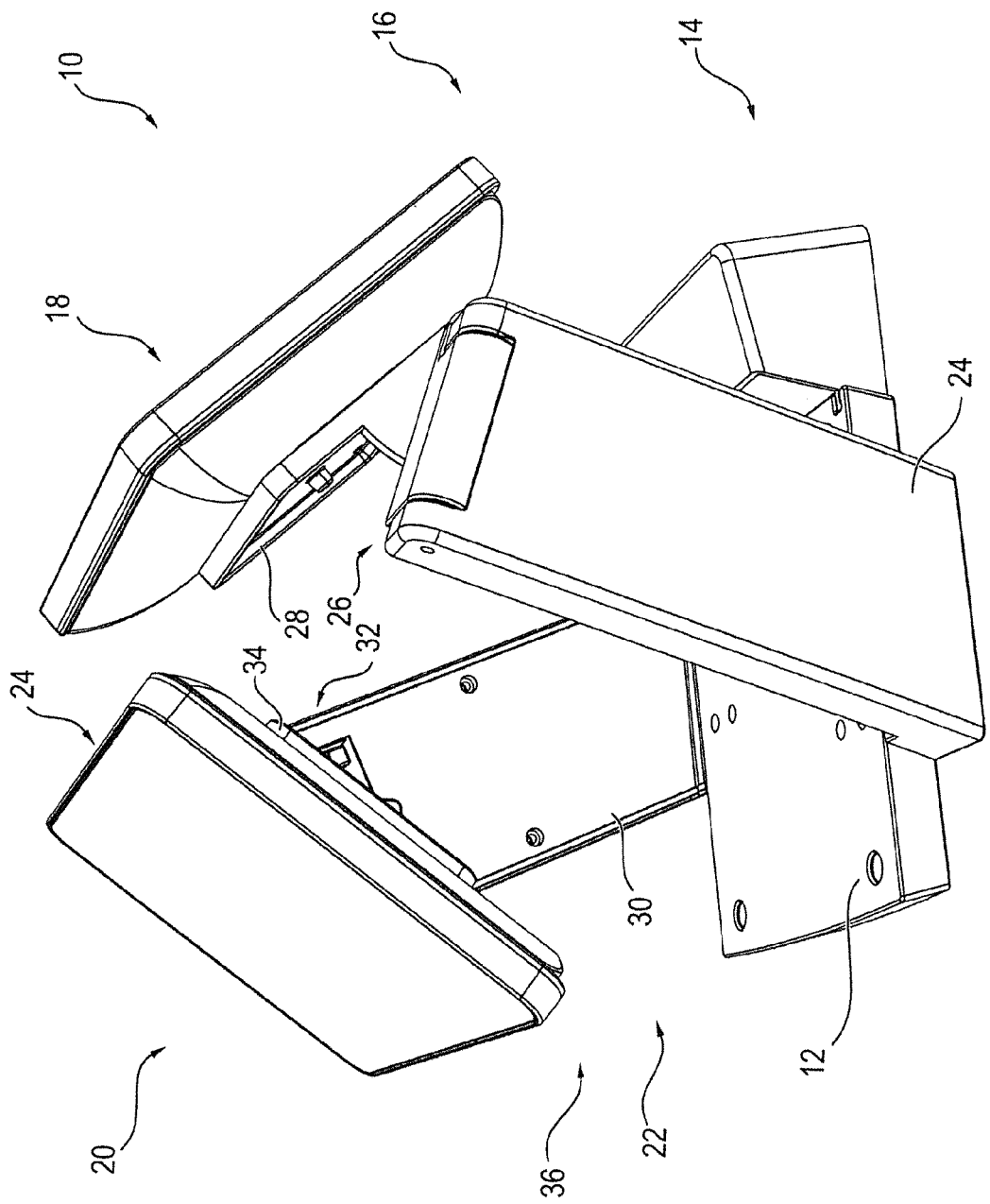
FIG. 1 shows a schematic, perspective illustration of a cash register system according to a first embodiment without printer.
Figure 2:
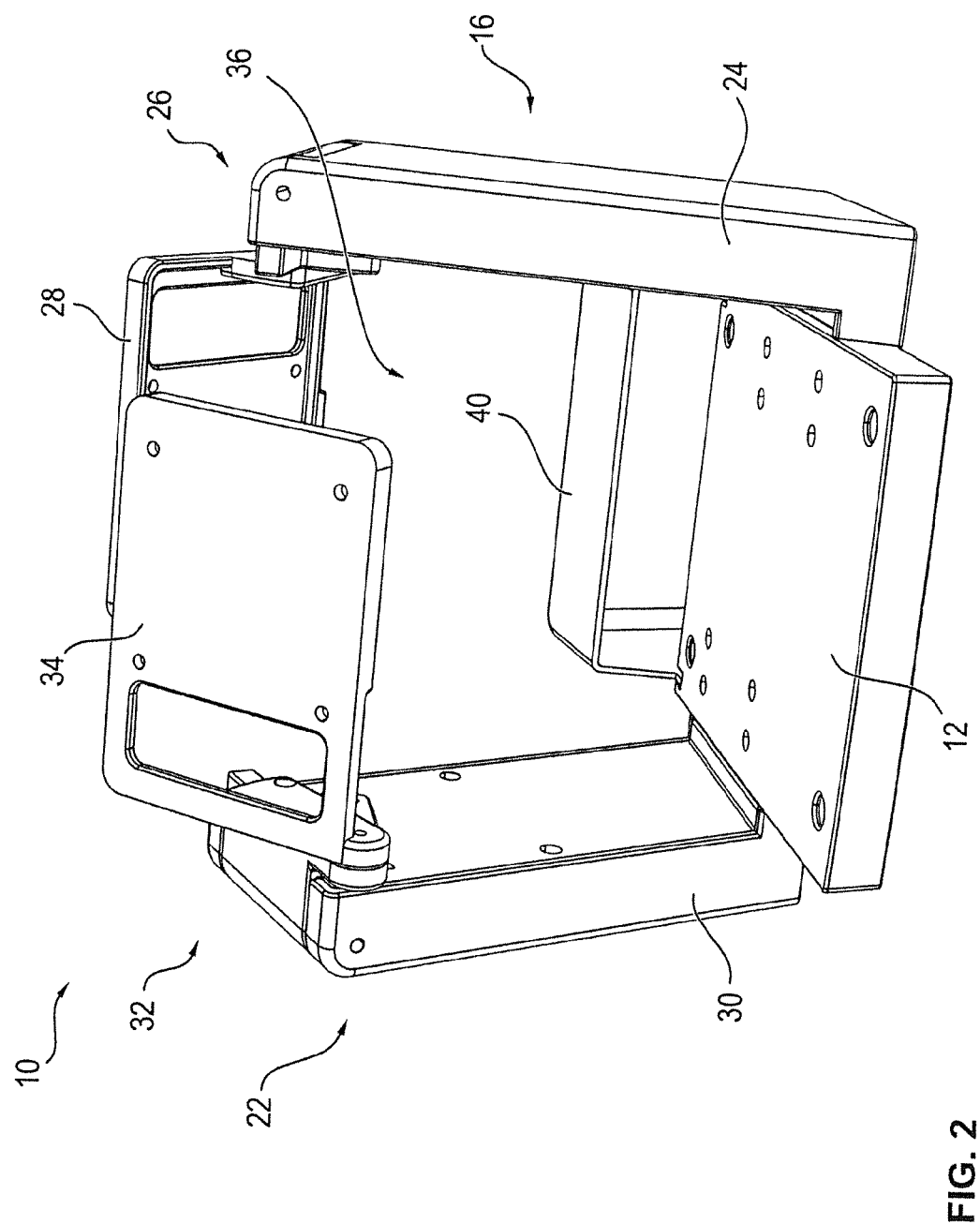
FIG. 2 shows a schematic, perspective illustration of the cash register system according to FIG. 1, with removed screens.

In FIGS. 1 and 2, a schematic, perspective illustration of a cash register system 10 according to a first embodiment is illustrated, wherein in FIG. 2 the display units 18, 24 are not illustrated for a better visibility of the other component parts.

The cash register system 10 comprises a carrier unit 12 via which the cash register system 10 can be placed on a base surface and in particular can also be mounted on this base surface. For mounting purposes, holes through which screws or similar elements can be passed are provided in the plate-shaped carrier unit 12 at least on the underside so that a firm mounting on the base surface is possible. On the upper side of the carrier unit 12, mounting units are preferably likewise provided, via which for example a receipt printer can be mounted on the carrier unit 12.

Further, on a first side 14, the cash register system 10 has a first arm 16 on which the first display unit 18 is mounted. On a second side 20 opposite to the first side 14, a second arm 22 is provided on which the second display unit 24 is mounted.

The display units 18, 24 are in particular screens via which the information is displayed. In particular, via one of the screens 18, 24 information is displayed to a customer and via the other to an operator of the cash register system 10, in particular a cashier. This information can, for example, be the scanned goods, their individual prices and/or the respective current total amount.

The display units 18, 24 can in particular each comprise a touchscreen so that not only information can be displayed via the touchscreen, but information can likewise be input. In a particularly preferred embodiment of the invention, the display units 18, 24 may not be mounted on the arms 16, 22 permanently but only a mounting unit via which one tablet each can be mounted as a display unit is provided on the arms 16, 22.

The first arm 16 has a first section 24, an articulation 26 and a second section 28, wherein the end of the first section 24 opposite to the articulation 26 is arranged fixedly on the carrier unit 12 and the second section 28 is connected in an articulated manner to the first section 24 via the articulation 26. The display unit 18 in turn is arranged on the second section 28.

The second arm 22 is in particular structured identically to the first arm 16 and accordingly has a first section 30 which is firmly connected to the carrier unit 12, an articulation 32 and a second section 34 on which in turn the second display unit 24 is mounted.

Figure 3:
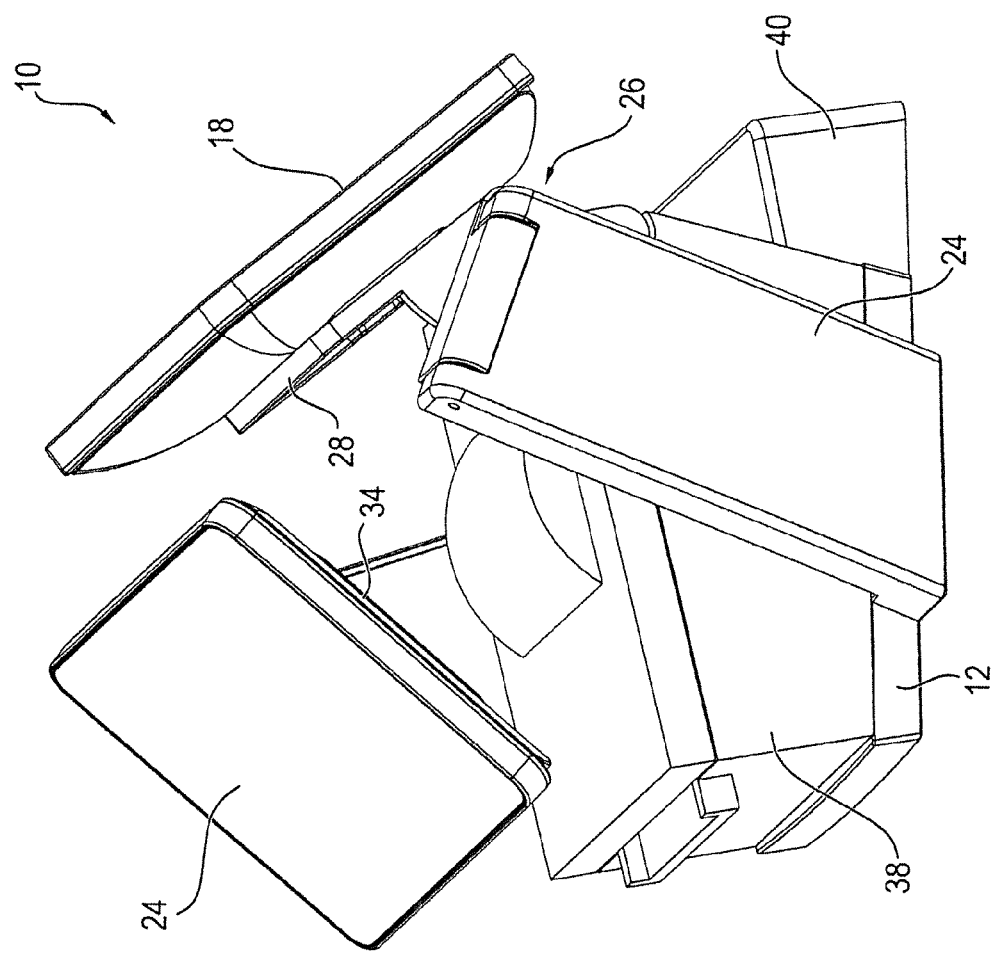
FIG. 3 shows a schematic, perspective illustration of the cash register system according to FIGS. 1 and 2, with a receipt printer and a display unit arranged in a first position.

A receiving area 36 in which, as shown in FIG. 3, a receipt printer 38 can be received, is delimited by the carrier unit 12, the first section 24 of the first arm 16 as well as the first section 30 of the second arm 22. Further, on one end of the carrier unit 12, a cover 40 is provided via which the interfaces of the receipt printer 38 and cables can be covered so that they are not visible and, in addition, are protected.

Figure 4:
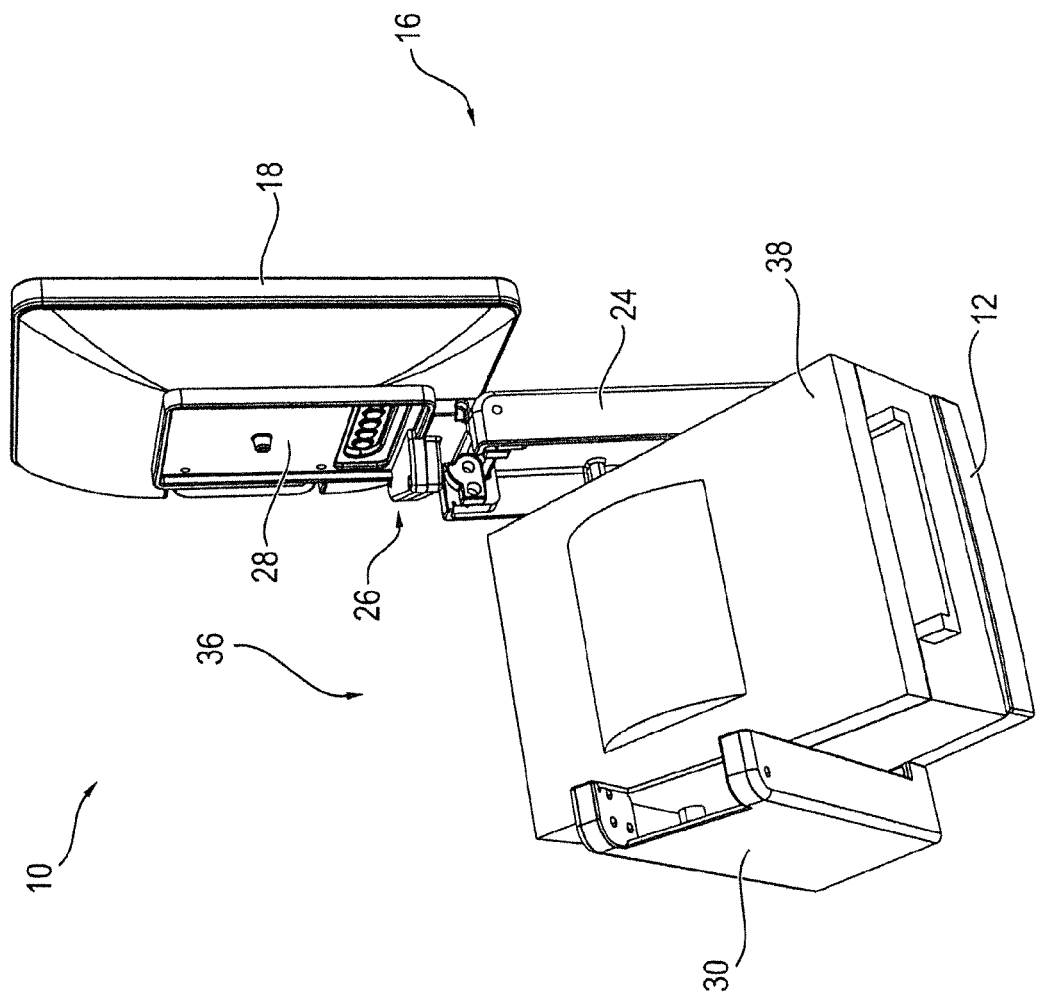
FIG. 4 shows a schematic, perspective illustration of the cash register system according to FIGS. 1 to 3, with a display unit arranged in a second position.

By means of the articulations 26, 32, the second sections 28, 34 of the arms 16, 22 and correspondingly also the display units 18, 24 mounted thereon can be pivoted between a first position shown in FIGS. 1 to 3 and a second position shown in FIG. 4, wherein in FIG. 4 for a better visibility of the first arm 16 the articulation 32, the second section 34 of the second arm 22 as well as the second display unit 24 are removed. In the first position shown in FIGS. 1 to 3, the second sections 28, 34 and thus also the display units 14, 24 are arranged relative to the first sections 24, 30 in an angled manner so that the second sections 28, 34 and the display units 18, 24 are arranged above the receiving area 36 and thus above the receipt printer 38. This first position is the position in which the display units 18, 24 are arranged while the cash register system 10 is used as intended, i.e. in the position in which they are oriented for viewing by the operator and the customer, respectively.

In the second position shown in FIG. 4, on the other hand, the second sections 28, 34 and the screens 18, 24 mounted thereon are pivoted upward relative to the first position such that the second sections 28, 34 and the display units 18, 24 are no longer arranged above the receiving area 36 and thus the printer 38 so that the printer 38 or other units arranged in the receiving area 36 can be freely accessed. In this first position, the first section 24 and the second section 28 and the first section 30 and the second section 34, respectively, are in each case arranged in particular in one plane so that as little space as possible is required by the cash register system 10.

As a result of this pivotability of the display units 18, 24 it is achieved that, on the one hand, a very compact cash register system 10 is formed and nevertheless an easy access to the units arranged in the receiving area 36 for their maintenance and/or replacement is possible.

In particular, only a very little base surface is required, namely a surface which is just as large as the relatively small carrier unit 12.

Figure 5:
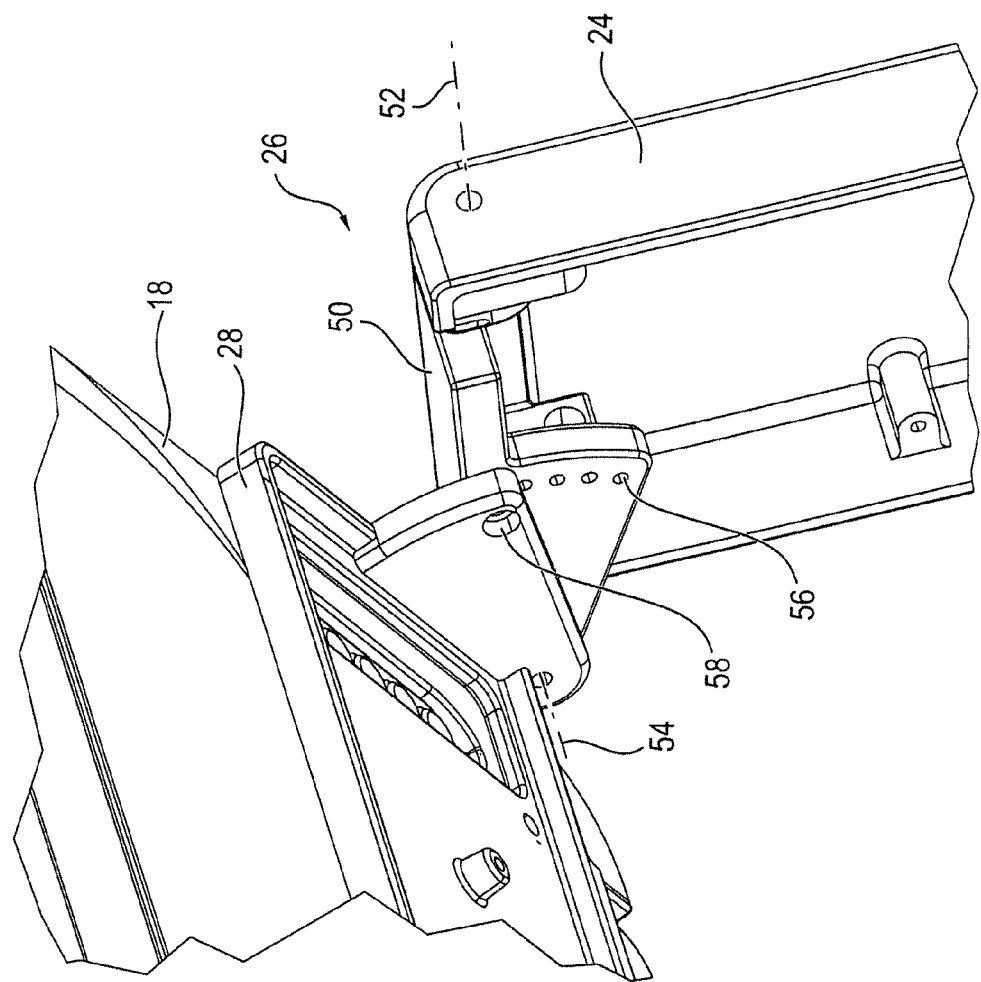
FIG. 5 shows a schematic, perspective illustration of a section of the cash register system according to FIGS. 1 to 4, with a view on an articulation.

In FIG. 5, an enlarged illustration of a detail of the cash register system 10 is shown, wherein the view is directed on the articulation 26 of the first arm 16 in order to describe its structure and its function in more detail. The second articulation 32 is structured analogously so that the following description applies analogously for this articulation.

The articulation 26 comprises an intermediate unit 50 which is rotatably mounted about an axis of rotation 52 on the first section 24. By pivoting the intermediate unit 50 about this axis of rotation 52, the second section 28 and thus the display unit 18 are pivoted from the first into the second position.

In the embodiment shown in FIG. 5, the second section 28 is not fixedly arranged on the intermediate unit 50 but is arranged rotatably about a further axis 54 on the intermediate unit 50, wherein by rotation about the axis 54 a tilting of the second section 28 and thus of the display unit 18 takes place by which the viewing angle can be set. In particular, several holes are provided in the intermediate unit 50, one of which is exemplarily identified with the reference sign 56. In the second section 28, a hole 58 is likewise provided, which can optionally be arranged in an aligned manner with one of the holes 56 so that through the holes arranged in an aligned manner a mounting element for holding the second section 28 and thus the display unit 18 in the desired tilted position can be passed.

Alternatively, the tiltability of the display unit 18 can also be realized by a gate, an elongated hole with clamps and/or a toothing with clamps.

The two axes 52 and 54 are in particular arranged orthogonally to each other.

Figure 6:
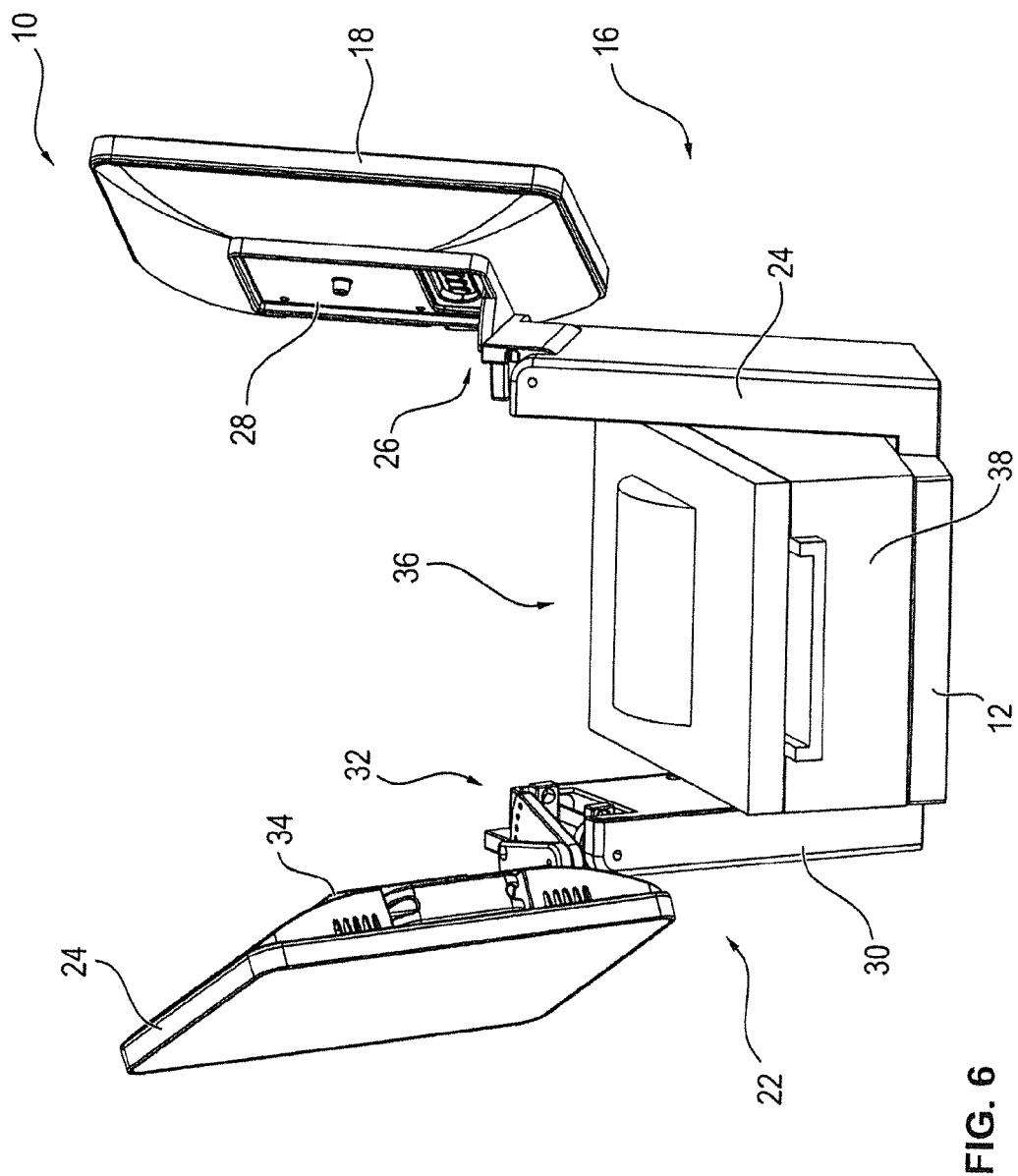
FIG. 6 shows a schematic, perspective illustration of the cash register system according to FIGS. 1 to 5, with a display unit arranged in a third position.

The tilting of the display unit 18 about the axis 54 can however not only be used when the second section 28 is arranged in the first position, i.e. the screen 18 is arranged above the printer 38, and thus the viewing angle is to be set, but also when the second section 28 and thus the display unit 18 are pivoted upward into the second position for maintenance so that by a corresponding tilting about the axis 54, the display unit 18 is arranged in the third position shown in FIG. 6. As a result thereof, an even greater access area to the receiving area 36 can be obtained.

Figure 7:
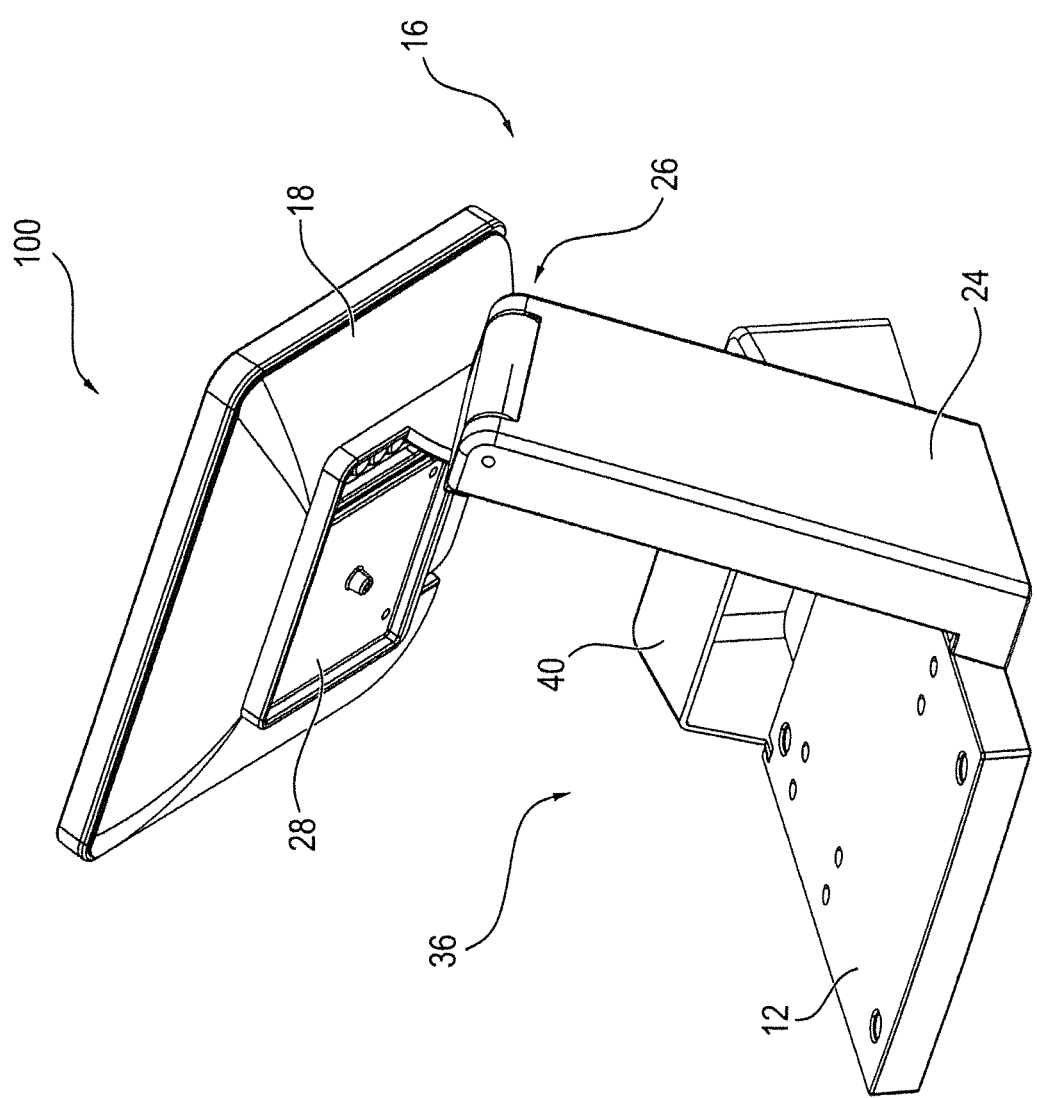
FIG. 7 shows a schematic, perspective illustration of a cash register system according to a second embodiment, with a display unit arranged in a first position.
Figure 8:
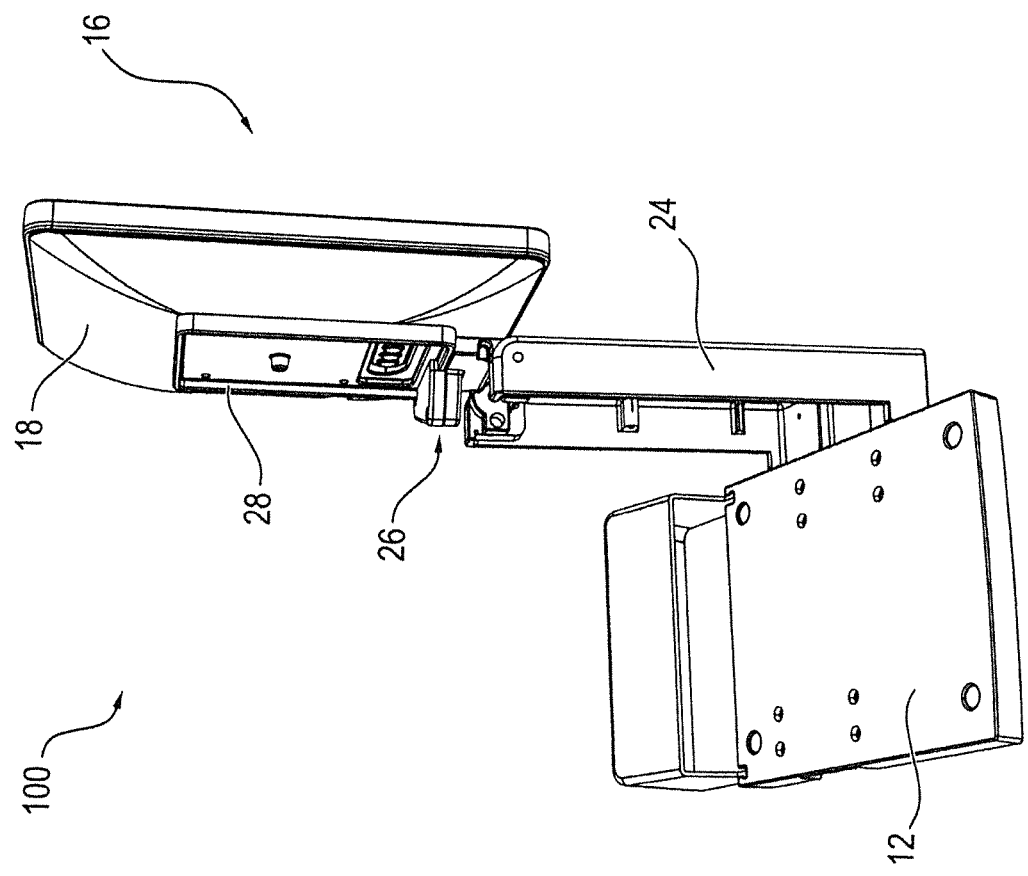
FIG. 8 shows a schematic, perspective illustration of the cash register system according to FIG. 7, with a display unit arranged in a second position.

In FIGS. 7 and 8, in each case a schematic, perspective illustration of a cash register system 100 according to a second embodiment is shown. Elements having the same structure or the same function are identified with the same reference signs.

In this second embodiment, the cash register system 100 only has one arm 16. Here, too, a pivoting of the second section 28 and the display unit 18 arranged thereon from the first position shown in FIG. 7 to the second position shown in FIG. 8 can be performed so that a better access to the units receivable in the receiving area 36 is possible.

LIST OF REFERENCE SIGNS 10, 100 cash register system
12 carrier unit
14, 20 side
16, 22 arm
18, 24 display unit
24, 30 first section
26, 32 articulation
28, 34 second section
36 receiving area
38 receipt printer
40 cover
50 intermediate unit
52, 54 axis
56, 58 hole

What is claimed is:
1. A cash register system, comprising:
 a carrier unit (12) configured for mounting the cash register system (10, 100) on a base surface,
 a first display unit (18) configured for displaying information to an operator or a customer, and
 a first arm (16) configured for holding the display unit (18), the first arm (16) having a first section (24) and a second section (28) pivotable relative to the first section (24), an end of the first section (24) opposite the second section (28) being mounted to the carrier unit (12), the first display unit (18) being arranged on the second section (28), wherein
 a receiving area (36) being delimited by the carrier unit (12) and the first section (30) of the first arm (16) and being configured for receiving a receipt printer (38),
 the second section (28) is articulated to the first section (24) so that in a first position the second section (28) is arranged above the receiving area (36) and in a second position the second section (28) is arranged so that an area above the receiving area (36) is free.

2. The cash register system (10, 100) of claim 1, further comprising a second display unit (24) for displaying information to an operator or a customer and a second arm (22) for holding the second display unit (24), the second arm (22) having a first section (30) and a second section (34) pivotable relative to the first section (30), the end of the first section (30) of the second arm (22) opposite to the second section (34) of the second arm (22) being mounted to the carrier unit (12), the second display unit (24) being arranged on the second section (34) of the second arm (22), the receiving area (36) being delimited by the first section (30) of the second arm (22), and the second section (34) of the second arm (22) being articulated to the first section (30) of the second arm (22) so that in a first position the second section (34) of the second arm (22) is above the receiving area (36) and in a second position the second section (34) of the second arm (22) is not arranged above the receiving area (36).

3. The cash register system (10, 100) of claim 2, wherein the first arm (16) and the second arm (22) are structured identically.

4. The cash register system (10, 100) of claim 2, wherein, in the second position of the first arm (16), the second section (28) of the first arm (16) and wherein in the first position of the second arm (22), the second section (34) of the second arm (22) are pivoted by an angle between 70° and 110° relative to the first position.

5. The cash register system (10, 100) of claim 1, wherein, in the first position of the first arm (16), the first section (24) and the second section (28) of the first arm (16) are orthogonal to each other and wherein in the first position of the second arm (22), the first section (30) and the second section (34) of the second arm (22) are orthogonal to each other.

6. The cash register system (10, 100) of claim 2, wherein in the second position of the first arm (16), the first section (24) and the second section (28) of the first arm (16) are arranged in one plane and wherein in the second position of the second arm (22), the first section (30) and the second section (34) of the second arm (22) are arranged in one plane.

7. The cash register system (10, 100) of claim 2, wherein the first section (24) and the second section (28) of the first arm (16) are connected to each other via an articulation (26) so that second section (28) is pivotable about a predetermined axis of rotation (52) relative to the respective first section (24) or the first section (30) and the second section (34) of the second arm (22) are connected to each other via an articulation (32) so that the second section (34) is pivotable about a predetermined axis of rotation (52) relative to the respective first section (30).

8. The cash register system (10, 100) of claim 7, wherein each articulation (26, 32) is designed so that the respective display unit (18, 24) is tiltable about a respective tilting axis (54) for setting the viewing angle.

9. The cash register system (10, 100) of claim 8, wherein the axis of rotation (52) is orthogonal to the tilting axis (54) of the respective articulation (26, 32).

10. The cash register system (10, 100) of claim 2, wherein at least one of the first display unit (18) and/or the second display unit (24) comprises a screen or a tablet and a mounting unit for receiving the tablet.

11. The cash register system (10, 100) of claim 2, wherein the first and second arms (16, 22) are arranged on opposite sides (14, 20) of the carrier unit (12).

12. The cash register system (10, 100) of claim 2, wherein the first and second arms (16, 22) are inclined to opposite sides.

13. The cash register system (10, 100) of claim 1, wherein the carrier unit (12) is plate-shaped.

14. The cash register system (10, 100) of claim 1, wherein the carrier unit (12) is configured so that a computer is receivable in the carrier unit (12).

15. The cash register system (10, 100) of claim 1, wherein the carrier unit (12) and/or the receiving area (36) are configured so that the receipt printer (38) is receivable and mountable in at least two different orientations that are rotated relative to each other by 180°.

\* \* \* \* \*